Sept. 30, 1952     K. O. STRANEY     2,612,627

FIELD MAPPING MACHINE

Filed Dec. 18, 1948     7 Sheets-Sheet 1

Inventor:
Kenneth O. Straney,
by Richard E. Hosley,
His Attorney.

Sept. 30, 1952  K. O. STRANEY  2,612,627
FIELD MAPPING MACHINE
Filed Dec. 18, 1948  7 Sheets-Sheet 2

Inventor:
Kenneth O. Straney,
by Richard E. Hosley
His Attorney.

Inventor:
Kenneth O. Straney,
by Richard E. Hosley
His Attorney.

Sept. 30, 1952    K. O. STRANEY    2,612,627
FIELD MAPPING MACHINE
Filed Dec. 18, 1948    7 Sheets-Sheet 4

Inventor:
Kenneth O. Straney,
by Richard E. Hosley
His Attorney.

Sept. 30, 1952 K. O. STRANEY 2,612,627
FIELD MAPPING MACHINE
Filed Dec. 18, 1948 7 Sheets-Sheet 5

Inventor:
Kenneth O. Straney,
by Richard E. Hosley,
His Attorney.

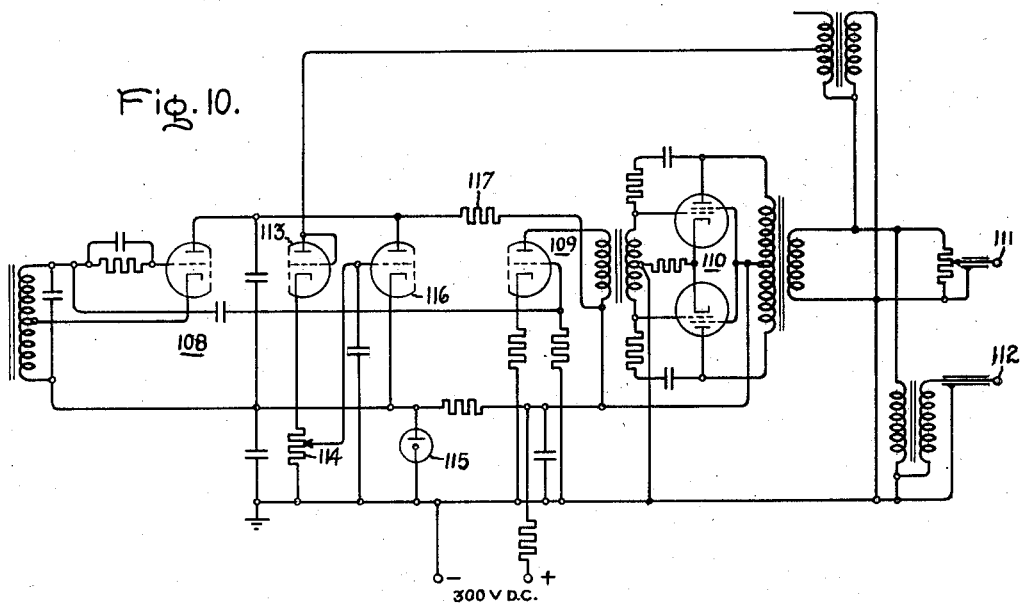
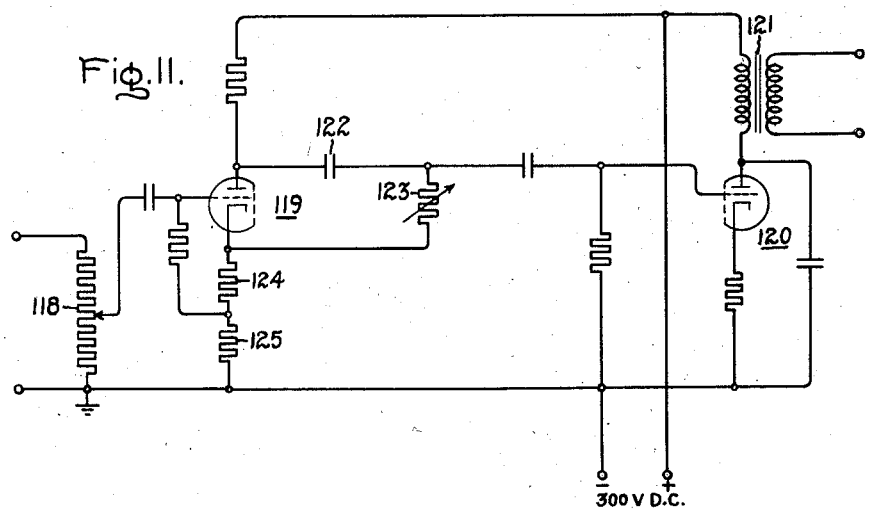

Sept. 30, 1952     K. O. STRANEY     2,612,627
FIELD MAPPING MACHINE
Filed Dec. 18, 1948     7 Sheets-Sheet 7
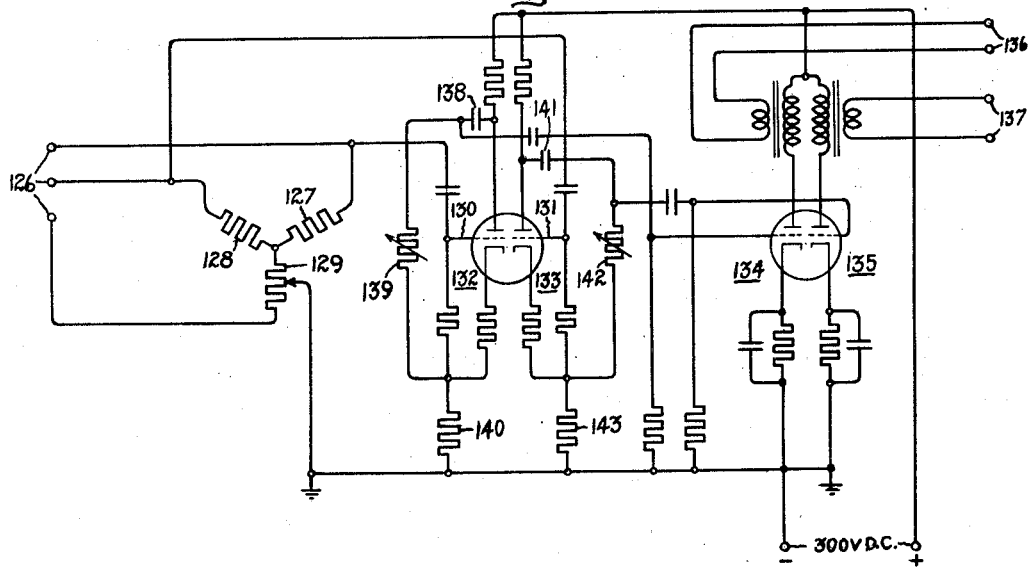
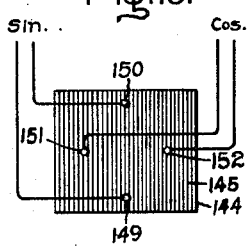
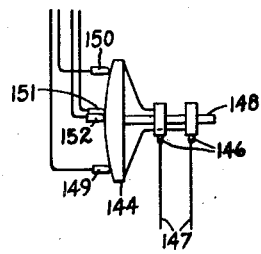
Inventor:
Kenneth O. Straney.
by Richard E. Hosley
His Attorney.

Patented Sept. 30, 1952

2,612,627

UNITED STATES PATENT OFFICE 2,612,627

FIELD MAPPING MACHINE

Kenneth O. Straney, Scotia, N. Y., assignor to General Electric Company, a corporation of New York Application December 18, 1948, Serial No. 66,124

16 Claims. (Cl. 318—19)

This invention relates to improvements in field mapping machines.

A principal object of the invention is to provide a machine for automatically tracing the equipotential lines in a field mapping tank. Other objects and advantages will appear as the description proceeds.

Figure 1:
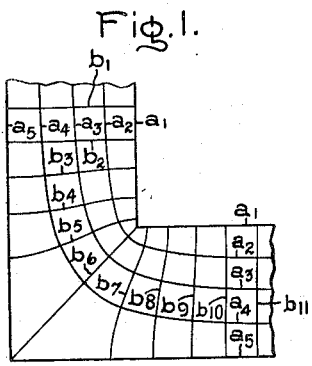
Figure 2:
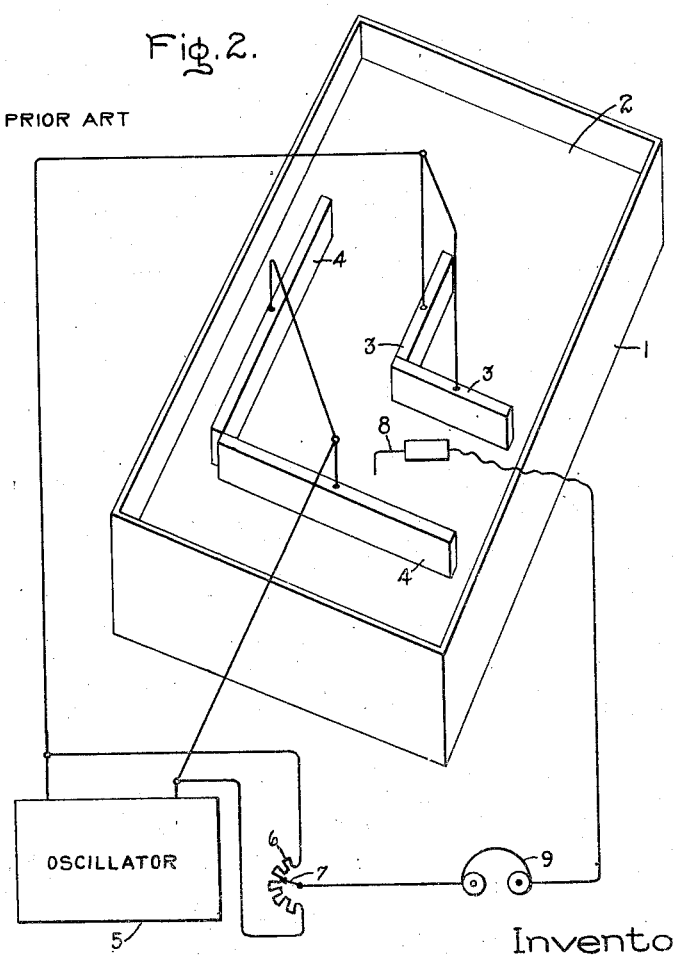
Figure 3:
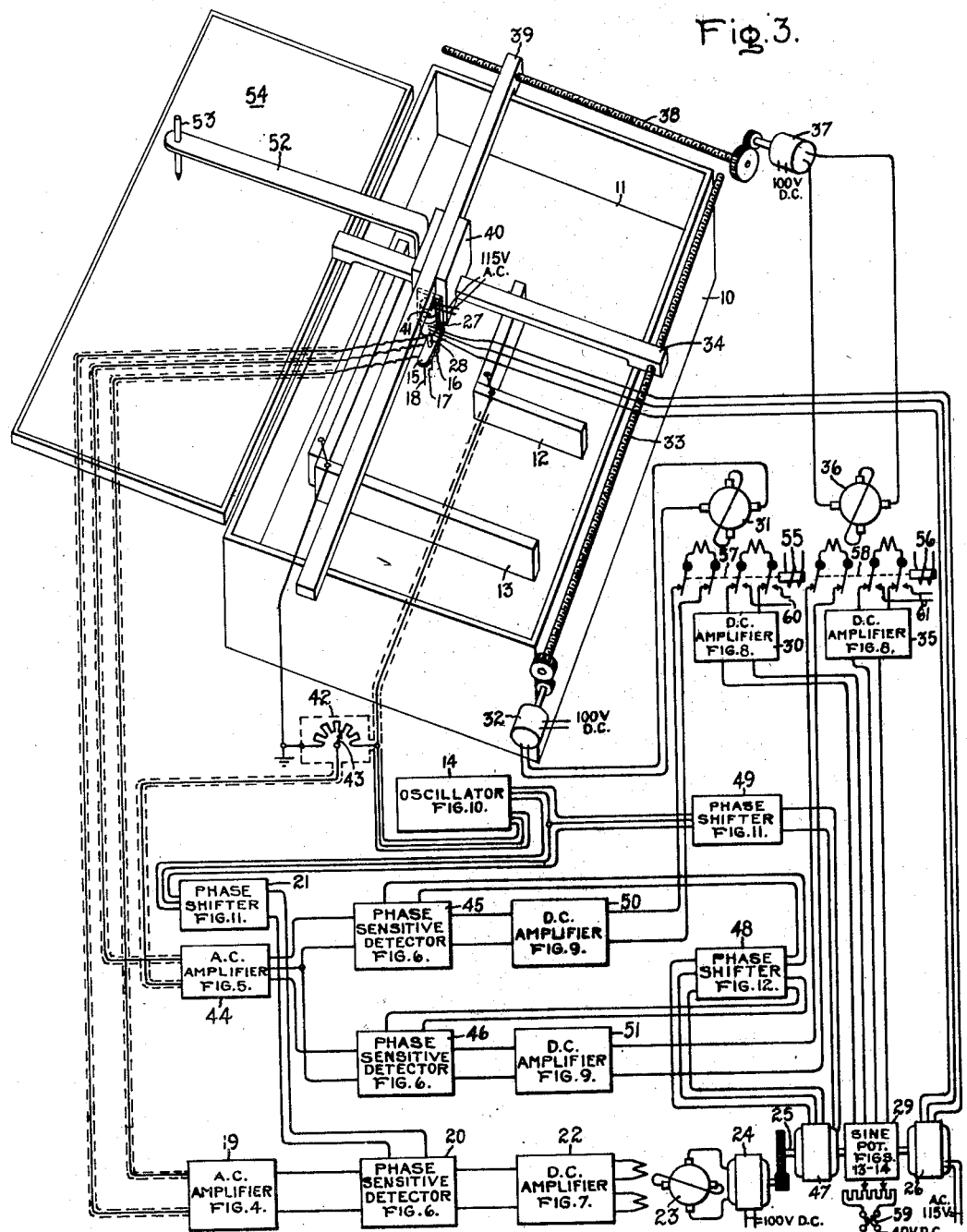
Figure 4:
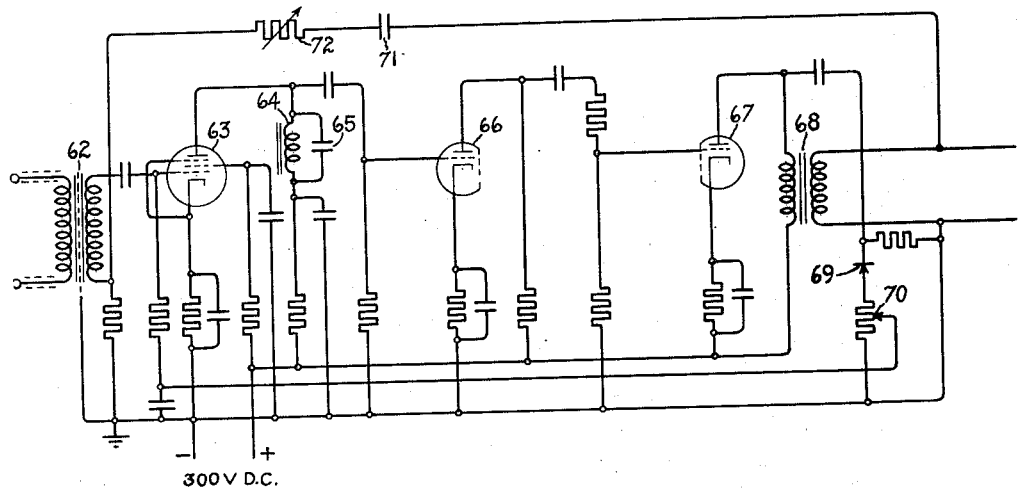
Figure 5:
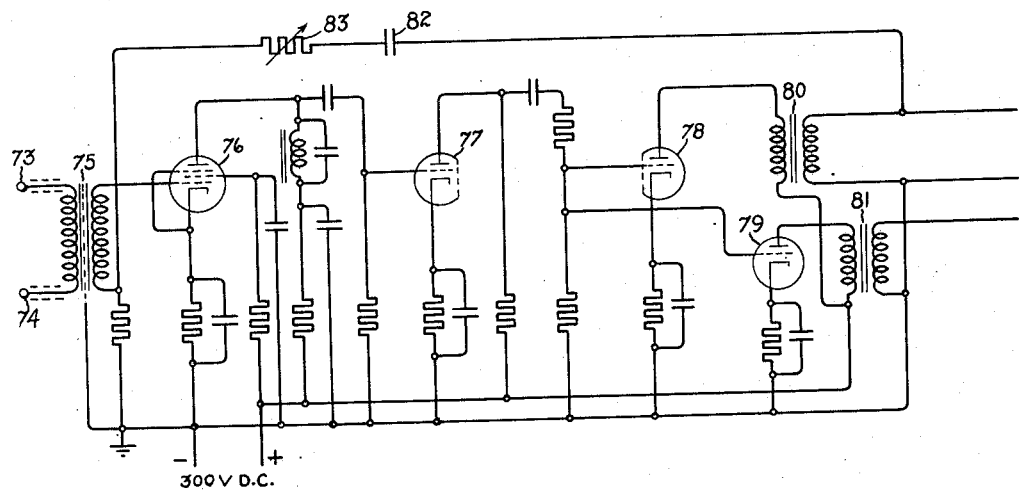
Figure 6:
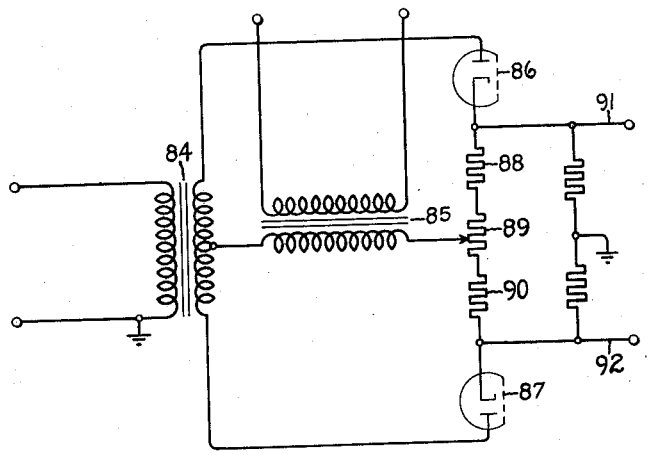
Figure 7:
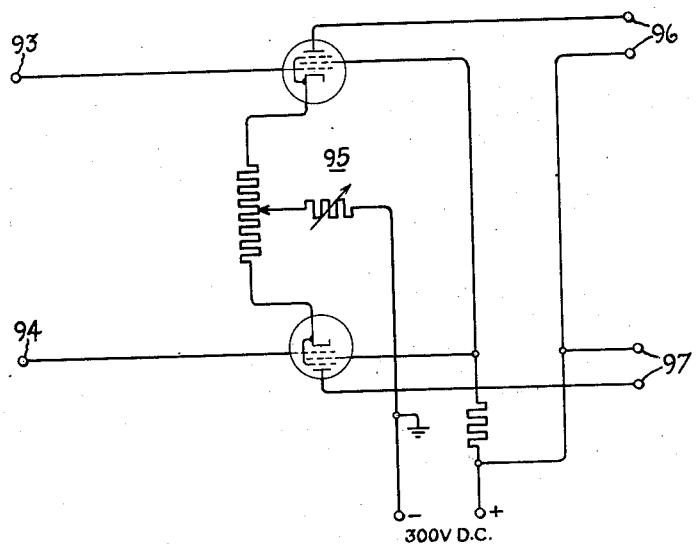
Figure 8:
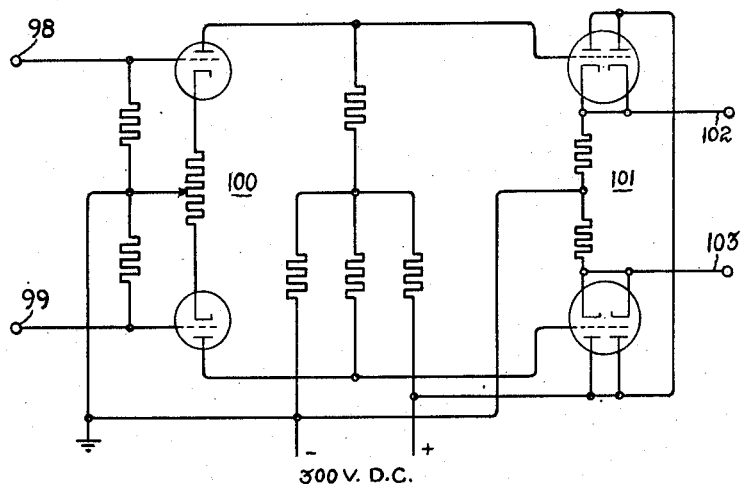
Figure 9:
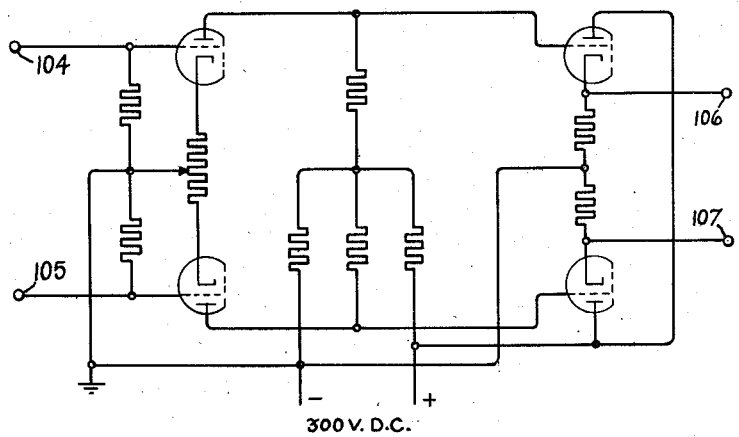

The features of the invention which are believed to be novel and patentable are pointed out in the claims forming a part of this specification. For a better understanding of the invention, reference is made in the following description to the accompanying drawing in which Fig. 1 is a field map for a simple configuration; Fig. 2 is a schematic illustration of prior art field mapping apparatus; Fig. 3 is a simplified schematic block diagram of a preferred embodiment of this invention; and Figs. 4 through 14 are illustrations of elements shown schematically by blocks in Fig. 3, as follows: Fig. 4 is a circuit diagram of an A.-C. amplifier, Fig. 5 is a circuit diagram of another A.-C. amplifier, Fig. 6 is a circuit diagram of a phase-sensitive detector, Fig. 7 is a circuit diagram of a D.-C. amplifier, Fig. 8 is a circuit diagram of another D.-C. amplifier, Fig. 9 is a circuit diagram of another D.-C. amplifier, Fig. 10 is a circuit diagram of the oscillator, Fig. 11 is a circuit diagram of a phase shifter, Fig. 12 is a circuit diagram of another phase shifter, and Figs. 13 and 14 are schematic views illustrating the construction of the sine potentiometer. Where the same part appears in more than one figure of the drawing, it is represented in each case by the same reference number.

Field mapping is useful in the study of electric and magnetic fields and also, using the electric field analogy, as an aid in constructing flow nets for problems in heat transfer and in irrotational flow of fluids.

As a relatively simple example, the problem of heat flow through a square corner of a furnace wall will be considered. If the wall is of homogeneous material having a known thermal conductivity, then under steady-state conditions of heat flow with a known temperature difference between the inside and outside surfaces of the wall, it is a relatively simple matter to determine the temperature distribution within straight portions of the wall and the rate of heat transfer through such portions. Where the wall is straight and of uniform thickness and remote from corners or other discontinuities, the temperature gradient through the wall is linear. For example, if the inner surface is at a temperature of 500° F. while the outer surface is at a temperature of 100° F., then along a plane halfway between the inner and outer surfaces the temperature is 300° F. The rate of heat transfer through such portions of the wall is equal to the area of the inner or outer surface, times the thermal conductivity of the material of which the wall is constructed, times the temperature difference between inner and outer surfaces, divided by the thickness of the wall.

Portions of the wall which are not straight, corners for example, present a more difficult problem since the temperature gradient through such portions is not uniform and since the inner and outer surfaces have, in general, different areas. Such problems are most easily solved by constructing a flow net.

Refer now to Fig. 1, which illustrates a field map or a flow net through or around a corner. Suppose that this flow net represents a horizontal cross section through a corner of the furnace wall under consideration. Line $a_1$ then represents the inner surface of the furnace wall which is at a temperature of 500° F. Line $a_5$ represents the outer surface of the wall which is at a temperature of 100° F. Lines $a_1$, $a_2$, $a_3$, $a_4$, and $a_5$ are "equal temperature" lines which represent temperatures of 500° F., 400° F., 300° F., 200° F., and 100° F., respectively. The non-linear temperature gradient at the corner is apparent: line $a_2$ is much closer to the inner surface at the corner than along straight portions of the line, whereas line $a_4$ is much farther from the outer surface at the corner.

Lines $b_1$ through $b_{11}$ are flow lines so constructed that the rate of heat transfer through the section between lines $b_1$ and $b_2$ is exactly equal to that through any other section bounded by two adjacent flow lines, for example $b_5$ and $b_6$. Since the flow through a straight portion of the wall not near a corner can be determined in the manner hereinbefore explained, or by experiment, it is a relatively simple matter, once a flow net has been constructed, to determine the rate of heat transfer through any portion of the wall simply by noting the number of flow lines in the flow net representing that portion.

Once a flow net has been obtained, its use is not limited to a specific problem since many analogous situations exist in which the flow nets or field maps are identical whenever the boundary configurations are the same. For example, the flow net of Fig. 1 could also represent water flowing slowly around a square bend in its channel. For this case, lines $a_1$ and $a_5$ represent sides of the channel, and the $a$ lines are flow lines or "stream lines." Since the rate of flow through the section between $a_1$ and $a_2$ is equal to the rate of flow through the section between $a_4$ and $a_5$, it is evident that in flowing around the corner the water must flow much faster at the inside of the corner between lines $a_1$ and $a_2$ than at the outside of the corner between lines $a_4$ and $a_5$. In fact, the relative average velocities are inversely proportional to the width of the respective sections and thus can be readily determined by measurements made on the flow net.

As another example, Fig. 1 may be a field map representing an electric field between two electrodes positioned at $a_1$ and $a_5$, respectively. The $a$ lines then represent equipotential lines. This analogy is helpful in constructing flow nets as hereinafter explained.

For simple configurations, such as the corner illustrated, flow nets and field maps may be constructed with the aid of mathematical analysis or by graphical "cut-and-try" techniques. However, the process is tedious even for simple configurations. Much time is saved, and solutions for more complicated configurations become possible, when a field mapping machine is used to trace the equipotential line $a$. Once lines $a$ are established, it is not too difficult a job to sketch in lines $b$ according to well-known geometrical relationships. The relationships usually employed are that lines $a$ and $b$ must be perpendicular wherever they cross, and that each mesh of the net should be as nearly as possible square: that is, for each mesh the average distances between the $a$ lines and the $b$ lines which form its boundaries should be the same.

Refer now to Fig. 2, which schematically illustrates a prior art field mapping machine. Tank 1 contains an electrolytic solution 2. Sets of electrodes 3 and 4 are arranged in the tank to have the configuration for which it is desired to construct a field map. The electrodes extend down into the electrolytic solution as shown, and oscillator 5 supplies an audio-frequency voltage between electrodes. Voltage divider 6 is connected across the output of oscillator 5, and provides at its adjustable tap 7 a potential which may be adjusted to a value equal to that of an equipotential line to be traced. Probe 8 is adapted to extend into the electrolytic solution and may be manually moved from place to place. Head receiver 9 is connected between tap 7 and probe 8, as shown.

Suppose, for example, it is desired to trace out equipotential line $a_3$, Fig. 1, which has a potential half-way in valve between those of lines $a_1$ and $a_5$. Tap 7 is adjusted to its middle or "half-way" position. Probe 8 is then moved about between electrodes 3 and 4 until a null position is found at which no signal is detected by head receiver 9. The point at which probe 8 is then located is a point on line $a_3$. The position of the probe is measured by suitable means, and this point is plotted on a sheet of graph paper. Other points along line $a_3$ are found in a similar manner, until enough points have been located to sketch in the equipotential line. Tap 7 may then be moved to a position one-fourth of the way from the top of voltage divider 6, and points along line $a_2$ may be located. Then tap 7 may be moved to a point one-fourth of the way from the bottom of the voltage divider, and points along $a_4$ are located. Lines $a_1$ and $a_5$ are drawn to correspond to the positions of electrodes 3 and 4, respectively. When the equipotential lines have been plotted, lines $b$ may be sketched in as previously explained.

While prior art field mapping apparatus eliminates much of the work and uncertainty from field map construction, the task is still a tedious one as a great many points must be located and plotted, especially where the configurations involved are complicated. This invention relates to a machine which will automatically trace the equipotential lines with little manipulation by the operator.

Refer now to Fig. 3, which is a simplified schematic diagram of a preferred embodiment of this invention. Tank 10 is adapted to contain electrolytic solution 11 and to have placed therein sets of electrodes 12 and 13, arranged in the configuration for which a field map is to be plotted. An oscillator 14 is connected to provide an alternating voltage between the sets of electrodes. This voltage may have a frequency of about 2,000 cycles per second, for example.

A probe assembly 15 preferably has three probes 16, 17, and 18, adapted to extend downward into the electrolytic solution and preferably spaced close together in a straight line. The spacing between probes is not critical, but should not be too great, as the width of the probe assembly limits the curvature of equipotential lines which may be followed accurately. A practical spacing has been found to be about ¼ inch apart for a large field mapping machine.

Probes 16 and 18 are connected to the input of A.-C. amplifier 19 so that any alternating voltage between these two probes is amplified and applied to the input of phase-sensitive detector 20. Detector 20 also receives voltage from oscillator 14 to provide a standard against which the phase of voltage between probes 16 and 18 is compared. A phase shifter 21 is provided to equalize differences in phase shift through the two electric circuits and permit adjustment of the system for the proper polarity of the output voltage of detector 20.

Detector 20 provides at its output a direct voltage which has a value dependent upon the alternating voltage between electrodes 16 and 18, and a polarity dependent upon the phase of this voltage in relation to the voltage supplied by oscillator 14. This direct voltage is amplified by D.-C. amplifier 22 and applied to the field windings of an amplidyne 23. The amplidyne in turn controls the armature current of a constant field D.-C. motor 24, which is connected through speed reduction gears to shaft 25 to which several elements are connected as shown. One of the elements connected to shaft 25 is a selsyn transmitter 26. This transmitter is connected to a selsyn receiver 27, which is mechanically connected to probe assembly 15 through shaft 28.

When probes 16 and 18 respectively are at points of different potential in the electrolytic solution, there is an alternating voltage between these two probes which has an amplitude substantially equal to this difference in potential and a phase relative to the voltage provided by oscillator 14 which depends upon the direction of alignment of the probe assembly relative to the electric field between the sets of electrodes. Responsive to this voltage, a direct current is provided to the field windings of amplidyne 23, as has been explained. The amplidyne in turn provides current to the armature of motor 24, which then operates to rotate shaft 25 and hence the rotor of selsyn transmitter 26. The rotor of selsyn receiver 27 rotates in synchronism with that of transmitter 26, and thus rotates probe assembly 15. This continues until probe 16 and probe 18 are at points of equal potential, whereupon the amplitude of alternating voltage between the probes is reduced to zero. Current through the field windings of amplidyne 23 is likewise reduced to zero, and rotation of the probe assembly stops.

When probes 16 and 18 are at points of equal potential, they are aligned tangent to an equipotential line of the electric field. That part of the machine which has just been described therefore constitutes a servo loop adapted to maintain the probe assembly aligned along a tangent to an equipotential line.

To trace the equipotential line, it is necessary that probe assembly 15 move in the direction of the line. This is approximately the same as the direction of the tangent along which the probe assembly is aligned. A way in which this may be accomplished will now be described.

Assume an arbitrary set of coordinates having an X axis extending from left to right across the tank and a Y axis extending from front to back of the tank perpendicular to the X axis. The tangent along which probe assembly 15 is aligned will form some angle with the positive direction of the X axis, hereinafter referred to as the X direction, which may have any value between zero and 360°. If the probe assembly is moved in the X direction at a speed proportional to the cosine of this angle, and in the Y direction at a speed proportional to the sine of this angle, the assembly will move in the direction of the tangent along which it is aligned. One way in which such motion can be realized is as follows:

Attached to shaft 25 is a special potentiometer 29 commonly known as a "sine pot." This sine pot. provides two voltages, one of which is proportional to the sine of the angle between the angular position of shaft 25 and a reference position which shaft 25 assumes when probe assembly 15 is aligned in the X direction. The second voltage provided by the sine pot. is proportional to the cosine of this angle.

The sine voltage is applied to the input of D.-C. amplifier 30, which provides current through one field winding of amplidyne 31, thus causing D.-C. motor 32 to rotate at a speed proportional to the sine voltage and in a direction dependent upon its polarity. Motor 32, acting through speed reducing gears, rotates lead screw 33 and thereby moves traveling arm 34 in the Y direction.

The cosine voltage is applied to the input of D.-C. amplifier 35, which provides direct current through one field winding of amplidyne 36, which in turn controls the operation of D.-C. motor 37. Motor 37, acting through speed reducing gears, rotates lead screw 38 and moves traveling arm 39 in the X direction.

Carriage 40 is mechanically coupled by suitable means to ride at the junction of traveling arms 34 and 39. Selsyn receiver 27 is mounted upon carriage 40 with a suitable bracket 41 so that, as the carriage moves, the selsyn receiver and the probe assembly move with it. Thus, this part of the apparatus serves the desired purpose of moving the probe assembly in the X direction at a speed proportional to the cosine of the angle between the direction of alignment of the probe assembly and the X direction, and to move the probe assembly in the Y direction at a speed proportional to the sine of this angle.

The arrangement of the traveling arms and mechanical linkages, whereby motors 32 and 37 control the position of probe assembly 15, has been shown in simplified schematic form to most clearly illustrate the principle involved. In actual practice, it may be desirable to provide lead screws at each end of each traveling arm to maintain correct alignment of the arms, or to use other mechanical drives and linkages which will occur to those skilled in the art.

The parts of the machine so far described are sufficient to move the probe assembly approximately along equipotential lines. However, errors would be accumulative and lead to somewhat uncertain results unless means were provided to correct deviations from the desired equipotential line whenever such deviations occur. A preferred way of correcting these deviations will now be described.

A voltage divider 42 is connected across the output of oscillator 14 as shown. This voltage divider has an adjustable tap 43 and corresponds generally to voltage divider 6 with its adjustable tap 7 of the prior art apparatus shown in Fig. 2. Tap 43 is adjusted to provide a potential equal to that of the equipotential line to be traced. The potential at 43 is compared with the potential at probe 17 by feeding both potentials into an A.-C. amplifier 44, which amplifies the A.-C. voltage resulting from a difference in the two potentials. Amplifier 44 provides two identical outputs, one of which is fed to phase-sensitive detector 45 and the other to phase-sensitive detector 46.

A selsyn transmitter 47 having its rotor connected to shaft 25 provides an output which has a phase position determined by the angular position of shaft 25, and hence by the alignment of probe assembly 15. This output is fed to a phase shifter 48 which supplies two reference voltages in phase quadrature with each other to phase-sensitive detectors 45 and 46, respectively. Energizing current is supplied to the rotor of transmitter 47 from oscillator 14. A phase shifter 49 may be inserted between the oscillator and the selsyn transmitter to compensate for phase shift inherent in the circuit.

The phase relations are such that the output of phase-sensitive detector 45 is jointly dependent upon the output of amplifier 44 and the sine of the angle between the direction of alignment of probe assembly 15 and the X direction. The output voltage of phase-sensitive detector 46 has a value and polarity jointly dependent upon the amplitude of the output of amplifier 44 and upon the cosine of this angle.

The output of detector 45 is fed to D.-C. amplifier 50, which provides direct current through the second field winding of amplidyne 31, and thus modifies the speed at which probe assembly 15 is moved in the Y direction. The output of detector 46 is fed to D.-C. amplifier 51, which provides direct current through the second field winding of amplidyne 36, and thus modifies the speed at which probe assembly 15 is moved in the X direction. These modifications in the speed at which probe assembly 15 is moved tend to correct any deviation from the equipotential line being traced, and thus eliminate cumulative errors.

Attached to carriage 40 by an arm 52 is a pen 53 which traces upon drawing paper 54 the equipotential line followed by probe assembly 15. Thus, each equipotential line is automatically recorded upon a sheet of drawing paper. It will be evident to those skilled in the art that recording at a distance can be accomplished by a suitable selsyn operated recorder.

Relays 55 and 56 are provided to open switches 57 and 58, respectively, at certain times, thereby stopping motion in the X and Y directions of probe assembly 15. As shown in the drawing, relays 55 and 56 are normally energized, thereby maintaining switches 57 and 58 closed to the left as shown. When relays 55 and 56 are deenergized, switches 57 and 58 are moved to the right. Limit switches may be provided to deenergize the relays whenever probe assembly 15 reaches a side of tank 10, or other point at which it is desired that motion should cease. Thus probe assembly 15 may be started from one side of the tank and made to move along an equipotential line to another side of the tank. There the limit switches will deenergize the relays and the probe assembly will stop. The assembly can then be moved to another equipotential line to be traced. The direction of motion across the tank of probe assembly 15 can be reversed by reversing switch 59, which reverses the polarity of voltage supplied to the sine pot.

When relays 55 and 56 are in their deenergized position, the movement of probe assembly 15 can be manually controlled by applying suitable voltages to terminals 60 and 61. These voltages may be supplied, for example, by any D.-C. voltage source and rheostats, not shown, for varying the value of the voltages to control the speed of the motors. This is useful in tracing the position of the electrodes. Probe assembly 15 is raised above the level of the electrodes, for example, by shortening shaft 28 which may be of the telescoping type. The manual controls may then be used to cause the probe assembly to move along the tops of the electrodes and thereby trace the electrode configuration on drawing sheet 54.

The elements represented by blocks in Fig. 3 are largely conventional, and variations in their design are possible without departing from the principles of the invention. By way of illustration, circuits will now be described which can be used for each of these elements, but it is not desired that the invention should be limited to the specific circuits described.

Refer now to Fig. 4, which is a circuit diagram of A.-C. amplifier 19. The primary of transformer 62 is connected between probes 16 and 18 (Fig. 3). Voltage from the transformer secondary is amplified by a substantially conventional vacuum tube amplifier stage 63. In the plate circuit of this amplifier stage is a choke 64 and capacitor 65 connected in parallel which are "peaked" or tuned to parallel resonance at the oscillator frequency of 2,000 cycles per second. This discriminates in favor of the desired signal and suppresses unwanted noise signals. Two conventional amplifier stages 66 and 67 follow which provide an output signal of approximately 10 volts across the secondary of transformer 68. A portion of the output voltage is rectified by rectifier 69 so that a negative voltage is provided across resistor 70 which is proportional in value to the amplitude of the output signal. A portion of this negative voltage is used to bias the grid of the vacuum tube in stage 63, thereby tending to reduce variations in amplitude in the output signal in a manner somewhat similar to the automatic volume control in a radio receiver. Negative feedback is provided through capacitor 71 and resistor 72 to stabilize the gain of the amplifier and supress noise originating in the amplifier circuit. Adjustable resistors 70 and 72 provide means for adjusting the sensitivity of the amplifier for small input voltages without exceeding the maximum desirable output for larger input voltages.

Fig. 5 is a circuit diagram of A.-C. amplifier 44. Probe 17 and voltage divider tap 43 (Fig. 3) are connected to terminals 73 and 74, respectively, across which is connected the primary of transformer 75. 76 and 77 are substantially conventional amplifier stages connected in cascade to amplify voltage from the secondary of transformer 75. The plate circuit of stage 76 is peaked at 2,000 cycles, the same as the first stage of amplifier 19. Amplifier stages 78 and 79 in parallel follow stage 77 and provide two substantially identical outputs across the secondaries of transformers 80 and 81, respectively. There is no "automatic-volume-control" in this circuit, but there is negative feedback through capacitor 82 and resistor 83.

Fig. 6 shows a phase-sensitive detector circuit. Three of these elements are employed, one each at 20, 45, and 46, Fig. 3. Referring now to Fig. 6, the input signal from an A.-C. amplifier is applied to the primary of transformer 84. The reference signal from one of the phase shifters is applied to the primary of transformer 85. Two rectifiers 86 and 87 and load resistors 88, 89, and 90 are connected in series across the secondary of transformer 84 to form two phase-opposed half-wave rectifying circuits. The secondary of transformer 85 is connected between center taps on the secondary of transformer 84 and on load resistor 89, respectively. An output is produced across the load resistors and hence between terminals 91 and 92 which is substantially proportional to the product of the amplitude of the input signal to transformer 84 times the cosine of the phase angle between the two input signals.

Fig. 7 is a circuit diagram of D.-C. amplifier 22. The input voltage from phase-sensitive detector 20 (Fig. 3) is applied between terminals 93 and 94 and is amplified by a conventional push-pull D.-C. amplifier stage 95. Output connections 96 and 97, respectively, are connected to the two field windings of amplidyne 23 (Fig. 3).

Fig. 8 is a circuit diagram of another D.-C. amplifier. Two of these units are required, one each at 30 and 35 (Fig. 3). A voltage from sine pot. 29 is applied between input terminals 98 and 99. A conventional push-pull D.-C. amplifier stage 100 and a push-pull D.-C. cathode follower stage 101 are connected in cascade to amplify this voltage. Each tube of the cathode follower comprises two sections connected in parallel to provide greater current output. Output connections 102 and 103 are connected to energize one field of amplidyne 31 or amplidyne 36 (Fig. 3).

Fig. 9 is a circuit diagram of another D.-C. amplifier. Two of these units are required, one each at 50 and 51 (Fig. 3). Voltage from a phase-sensitive detector is applied between input terminals 104 and 105. The circuit is the same as that of Fig. 8, except that only one tube section is used in each half of the cathode follower stage. Output connections 106 and 107 are connected to energize the second field winding of amplidyne 31 or amplidyne 36 (Fig. 3).

Fig. 10 is a circuit diagram of 2,000 cycles per second stabilized oscillator 14. Stage 108 is a substantially conventional Hartley-type oscillator having an iron-cored inductor in the tuned circuit. The output of this oscillator is amplified by a conventional amplifier stage 109 and a push-pull amplifier stage 110 connected in cascade. Two parallel outputs are provided. Output 111 is connected to electrodes 12 and 13 and to voltage divider 42 (Fig. 3). Output 112 is connected to phase shifters 21 and 49. The amplitude of the output is stabilized in the following manner: Part of the output of oscillator 108 is rectified by diode-connected vacuum tube 113, which thus provides a positive voltage across its load resistor 114 which has a value proportional to the amplitude of the output. This voltage is in effect compared with a standard voltage drop of 75 volts across a voltage regulator tube 115 by applying voltage from resistor 114 to the grid of a vacuum tube 116 and applying voltage from tube 115 to the cathode of tube 116. If the amplitude of the oscillator output increases, the grid of tube 116 is made more positive so that this tube draws more current through a resistor 117 which is connected in the plate voltage supply circuit of oscillator 108. The increased voltage drop across resistor 117 due to more current flowing through tube 116 decreases the plate voltage of oscillator 108, which tends to reduce the amplitude of its output. Conversely, if the amplitude of the output decreases, the grid of tube 116 becomes more negative and the plate voltage of oscillator 108 is increased. The amplitude can be conveniently adjusted to a satisfactory value by adjusting a variable tap on resistor 114.

Fig. 11 is a circuit diagram of a phase shifter. Two of these elements are required, one at 21 and one at 49 (Fig. 3). 2,000 cycles per second voltage from the oscillator is applied across resistor 118. This voltage is amplified by amplifier stages 119 and 120 connected in cascade. The secondary of output transformer 121 is connected either to phase sensitive detector 20 or to the rotor of selsyn transmitter 47, as shown in Fig. 3. Associated with stage 119 is a feedback loop comprising a capacitor 122 and resistor 123 connected in parallel with the tube, and cathode resistors 124 and 125. This feedback loop provides a phase shift which depends upon the ratio of capacitance to resistance in the loop, and thus can be varied by varying the resistance of resistor 123. This adjustment determines the amount of phase shift produced by the complete circuit shown in Fig. 11.

Fig. 12 is a circuit diagram of phase shifter 48 (Fig. 3). Referring now to Fig. 12, terminals 126 are connected to and receive "three-space-phase" voltage from selsyn transmitter 47 (Fig. 3). Resistors 127, 128, and 129, which are Y-connected to terminals 126, are equal in value, but resistor 129 is provided with a grounded tap which is set at one-third of the distance from the center point of the Y. The outer ends of resistors 127 and 128 are respectively connected to the grids 130 and 131 of a dual triode vacuum tube, the two halves of which are respectively connected as parts of amplifier stages 132 and 133. This provides voltages at grids 130 and 131 which have a phase difference of approximately 90°. The voltages are amplified by vacuum tube stages 132 and 133 and are further amplified by amplifier stages 134 and 135 which are connected in cascade with stages 132 and 133. Thus, two outputs having a phase difference of 90° are provided at output terminals 136 and 137, which are respectively connected to phase-sensitive detectors 45 and 46 (Fig. 3). Stage 132 has a positive feedback loop comprising a capacitor 138 and resistors 139 and 140 connected in parallel with the output of the tube. Feedback voltage is developed in resistor 140 which is connected in the cathode circuit of the tube. Stage 133 has a similar feedback loop comprising a capacitor 141 and resistors 142 and 143. Phase adjustment of the two output voltages can be made by adjusting the value of resistors 139 and 142, respectively, which adjustments change the capacitance to resistance ratio of the respective feedback loops and thus shift the phase of the feedback voltage.

Refer now to Figs. 13 and 14, which are schematic diagrams illustrating construction of the sine pot. Fig. 13 is a face view of the resistor card of a sine pot., while Fig. 14 is an end view of the card and assembly. Card 144 has wound about it a high precision winding of resistance wire 145. The two ends of this winding are connected through brushes 146 to leads 147, which are connected to a source of D.-C. voltage. The card is mounted upon and rotates with a shaft 148, which is connected by suitable means to rotate in synchronism with shaft 25 (Fig. 3).

Contacting the resistance wire on the face of card 144 are four stationary brushes 149, 150, 151, and 152. Brushes 149 and 150 are connected to D.-C. amplifier 30 (Fig. 3), and brushes 151 and 152 are connected to D.-C. amplifier 35 (Fig. 3). The position of the card shown in Fig. 13 is the reference position corresponding to alignment of probe assembly 15 with the X direction. In this position, there is a relatively very small section of wire 145 between brushes 149 and 150. Voltage drop through this small section is substantially zero. On the other hand, there are a great many turns of wire 145 between brushes 151 and 152. The voltage drop across this large section of wire is correspondingly large. As the card is rotated, a larger and larger section of wire 145 is included between brushes 149 and 150 so that the voltage between these brushes increases to a maximum which occurs at 90° rotation of the card. Upon further rotation of the card, the voltage between brushes 149 and 150 decreases to zero at 180° rotation, then increases with opposite polarity to a maximum at 270° rotation, then decreases to zero again at 360° rotation. In fact, the voltage between brushes 149 and 150 is substantially proportional to the sine of the angle of rotation, and the voltage between terminals 151 and 152 is substantially proportional to the cosine of the same angle.

It will be evident that modifications of the apparatus can be made without changing the principles of the invention. For example, the number of probes in probe assembly 15 can be varied. One such variation is to eliminate probe 18 and use a two-probe assembly. In this case, the difference in potential between probes 16 and 17 can be used to control the angular alignment of assembly 15, just as a like difference in potential between probes 16 and 18 is used in the machine described. In effect, one probe 17 performs the functions of two probes 17 and 18 of the embodiment illustrated.

Having described the principle of this invention and the best mode in which I have contemplated applying that principle, I wish it to be understood that the apparatus described is illustrative only and that other means can be employed without departing from the true scope of the invention defined by the following claims.

What I claim as new and desire to secure by Letters Patent of the United States is:

1. In a field mapping machine, the combination of a probe assembly including a plurality of probes, means for aligning two of said probes along a tangent of an equipotential line of the field mapped, means to move said probe assembly in one direction at a speed substantially proportional to the cosine of the angle between such tangent and such direction, and means to move the probe assembly perpendicular to such direction at a speed substantially proportional to the sine of such angle.

2. In a field mapping machine, the combination of a probe assembly including at least two probes, a servo loop connected to rotate said probe assembly responsive to a voltage between probes, so that said assembly is aligned along a tangent to an equipotential line of the field mapped, means operated by said servo loop to provide first and second voltages proportional to the cosine and sine respectively of the angle between such tangent and a reference direction, and means to move the probe assembly in the reference direction at a speed substantially proportional to the first voltage and perpendicular to the reference direction at a speed substantially proportional to the second voltage.

3. In a field mapping machine, the combination of a tank for containing an electrolytic solution, a plurality of electrodes placed therein, an oscillator connected to supply alternating voltage between the electrodes, a probe assembly including at least two probes positioned to extend into the electrolytic solution, means including at least one amplifier and a phase-sensitive detector to provide a direct current dependent in polarity and value upon the amplitude and phase of alternating voltage between two of said probes, means including a motor to rotate said probe assembly responsive to such direct current, so that said assembly is aligned along a tangent to an equipotential line of the field mapped, means operated by said motor to provide first and second voltages proportional to the cosine and sine respectively of the angle between such tangent and a reference direction, and means to move the probe assembly in the reference direction at a speed substantially proportional to the first voltage and perpendicular to the reference direction at a speed substantially proportional to the second voltage.

4. In a field mapping machine, the combination of a probe assembly, means for aligning said assembly along a tangent to an equipotential line of the field mapped, means to move said assembly in a first direction corresponding to one of the coordinates of the field map to be prepared, means to move said assembly in a second direction corresponding to another of such coordinates, means to provide selectively potentials respectively equal to those of the equipotential lines to be traced, and means to modify the speed in at least one direction at which said probe assembly is moved responsive jointly to differences between the potential so provided and a potential at said probe assembly and to the direction of alignment of said assembly, so that the probe assembly is automatically returned to the equipotential line traced whenever its position deviates therefrom.

5. In a field mapping machine, the combination of a probe assembly including a plurality of probes, means for aligning two of said probes along a tangent to an equipotential line of the field mapped, means to move said probe assembly in one direction at a speed substantially proportional to the cosine of the angle between such tangent and such direction, means to move the probe assembly perpendicular to such direction at a speed substantially proportional to the sine of such angle, means to provide selectively potentials respectively equal to those of the equipotential lines to be traced, and means to modify the speed at which said probe assembly is moved responsive to differences between the potential so provided and the potential at one of said probes, so that the probe assembly is automatically returned to the equipotential line traced whenever its position deviates therefrom.

6. In a field mapping machine, the combination of a probe assembly including a plurality of probes, means for aligning two of said probes along a tangent to an equipotential line of the field mapped, means to move said assembly in mutually perpendicular directions, means to provide selectively potentials respectively equal to those of the equipotential lines to be traced, means including at least one amplifier and at least one phase-sensitive detector to provide a direct current jointly dependent in value and polarity upon differences between the potential so provided and the potential at one of said probes and upon the direction of alignment of said assembly, and means to modify the relative speed in different directions at which said probe assembly is moved responsive to such direct current.

7. In a field mapping machine, the combination of a tank to contain an electrolytic solution, a pluarity of electrodes placed therein, an oscillator connected to supply an alternating voltage between the electrodes, a probe assembly including at least two probes positioned to extend into the electrolytic solution, means including at least one amplifier and a phase-sensitive detector to provide a first direct current dependent in polarity and value upon the amplitude and phase of alternating voltage between two of said probes, means including a motor to rotate said probe assembly responsive to such first direct current, so that said assembly is aligned along a tangent to an equipotential line of the field mapped, means operated by said motor to provide first and second voltages proportional to the cosine and sine respectively of the angle between such tangent and a reference direction, means to move the probe assembly in the reference direction at a speed substantially proportional to the first voltage and perpendicular to the reference direction at a speed substantially proportional to the second voltage, a voltage divider connected across the output of said oscillator, said voltage divider having an adjustable tap to provide selectively potentials respectively equal to those of the equipotential line to be traced, means including at least one amplifier and at least two phase-sensitive detectors to provide second and third direct currents jointly dependent in value and polarity upon differences between the potential provided at the voltage divider tap and the potential at one of said probes and upon the cosine and sine respectively of the angle between the direction of alignment of the probe assembly and the reference direction, and means to modify the relative speeds in different directions at which said probe assembly is moved responsive to such direct currents.

8. A field mapping machine for automatically mapping equipotential lines in an electrolytic tank, comprising a probe assembly including a plurality of probes positioned to extend into the electrolytic tank, apparatus for rotating said probe assembly connected for actuation by voltage between two of said probes, whereby the two probes are aligned tangent to an equipotential line, apparatus including a motor for moving said probe assembly across the electrolytic tank in a reference direction at a speed proportional to the cosine of the angle between the direction of probe alignment and such reference direction, and apparatus including a motor for moving said probe assembly across the electrolytic tank perpendicular to such reference direction at a speed proportional to the sine of such angle.

9. A field mapping machine for automatically mapping equipotential lines in an electrolytic tank, comprising a probe assembly including a plurality of probes positioned to extend into the electrolytic tank, apparatus including a first motor for rotating said probe assembly, control means for operating said first motor electrically connected to two of said probes and actuated by voltage therebetween, whereby the two probes are aligned tangent to an equipotential line, apparatus including a second motor for moving said probe assembly across the electrolytic tank in a reference direction at a speed proportional to the cosine of the angle between the direction of probe alignment and such reference direction, and apparatus including a third motor for moving said probe assembly across the electrolytic tank perpendicular to such reference direction at a speed proportional to the sine of such angle.

10. A field mapping machine for automatically mapping equipotential lines in an electrolytic tank, comprising a probe assembly including a plurality of probes positioned to extend into the electrolytic tank, a reversible D.-C. motor, means including a phase sensitive detector connected to two of said probes in responsive relation to voltage therebetween and connected in operating relation to said reversible motor for operating such motor upon occurrence of such voltage in a direction determined by the phase of the voltage, means for rotating said probe assembly upon operation of said reversible motor, whereby the probes are aligned tangent to an equipotential line, apparatus including a motor for moving said probe assembly across the electrolytic tank in a reference direction at a speed proportional to the cosine of the angle between the direction of probe alignment and such reference direction, and apparatus including a motor for moving said probe assembly across the electrolytic tank perpendicular to such reference direction at a speed proportional to the sine of such angle.

11. A field mapping machine for automatically mapping equipotential lines in an electrolytic tank, comprising a probe assembly including a plurality of probes positioned to extend into the electrolytic tank, a reversible D.-C. electric motor, means including a phase sensitive detector connected to two of said probes in responsive relation to voltage therebetween and connected in operating relation to said reversible motor for operating such motor upon occurrence of such voltage in a direction determined by the phase of the voltage, a selsyn transmitter and a selsyn receiver electrically connected together, said transmitter having a rotor connected for rotation by said reversible motor upon operation thereof and said receiver having a rotor connected to rotate said probe assembly, whereby the probes are aligned tangent to an equipotential line, apparatus including a motor for moving said probe assembly across the electrolytic tank in a reference direction at a speed proportional to the cosine of the angle between the direction of probe alignment and said reference direction, and apparatus including a motor for moving said probe assembly across the electrolytic tank perpendicular to said reference direction at a speed proportional to the sine of such angle.

12. A field mapping machine for automatically mapping equipotential lines in an electrolytic tank, comprising a probe assembly including a plurality of probes positioned to extend into the electrolytic tank, apparatus including a first motor for rotating said probe assembly connected for actuation by voltage between two of said probes, whereby the two probes are aligned tangent to an equipotential line, apparatus including a second motor for moving said probe assembly across the electrolytic tank in a reference direction, apparatus including a third motor for moving said probe assembly across the electrolytic tank perpendicular to the reference direction, a sine potentiometer connected to provide a first voltage having a value proportional to the cosine of the angle between the direction of probe alignment and such reference direction and to provide a second voltage having a value proportional to the sine of such angle, means for regulating the speed of said second motor to a value proportional to said first voltage, and means for regulating the speed of said third motor to a value proportional to said second voltage.

13. A field mapping machine for automatically mapping equipotential lines in an electrolytic tank, comprising a probe assembly including a plurality of probes positioned to extend into the electrolytic tank, a reversible D.-C. electric motor, means including a phase sensitive detector connected to two of said probes in responsive relation to voltage there between and connected in operating relation to said reversible motor for operating such motor upon occurrence of such voltage in a direction determined by the phase of the voltage, a selyn transmitter and a selsyn receiver electrically connected together, said transmitter having a rotor connected for rotation by said reversible motor upon operation thereof and said receiver having a rotor connected to rotate said probe assembly, whereby the probes are aligned tangent to an equipotential line, apparatus including a second motor for moving said probe assembly across the electrolytic tank in a reference direction, apparatus including a third motor for moving said probe assembly across the electrolytic tank perpendicular to such reference direction, a sine potentiometer connected to provide a first voltage having a value proportional to the cosine of the angle between the direction of probe alignment and such reference direction and to provide a second voltage proportional to the sine of such angle, means for regulating the speed of said second motor to a value proportional to said first voltage, and means for regulating the speed of said third motor to a value proportional to said second voltage.

14. A field mapping machine for automatically mapping equipotential lines in an electrolytic tank, comprising a probe assembly including a plurality of probes positioned to extend into the electrolytic tank, apparatus for rotating said probe assembly connected for actuation by voltage between two of said probes, whereby the two probes are aligned tangent to an equipotential line, apparatus including a motor for moving said probe assembly across the electrolytic tank in a reference direction at a speed proportional to the cosine of the angle between the direction of probe alignment and said reference direction, apparatus including a motor for moving said probe assembly across the electrolytic tank perpendicular to said reference direction at a speed proportional to the sine of such angle, means to provide a reference electric potential equal to that of the equipotential line to be traced, and motor speed control means connected in responsive relation to differences between the electric potential of one of said probes and said reference potential and connected in operating relation to one of said motors for modifying the speed of such motor responsive to such potential difference so that the probe is automatically returned to the equipotential line whenever its position deviates therefrom.

15. A field mapping machine for automatically mapping equipotential lines in an electrolytic tank, comprising a probe assembly including a plurality of probes positioned to extend into the electrolytic tank, apparatus including a first reversible D.-C. motor for rotating said probe assembly connected for actuation by voltage between two of said probes, whereby the two probes are aligned tangent to an equipotential line, apparatus including a second reversible D.-C. electric motor for moving said probe assembly across the electrolytic tank in a reference direction, apparatus including a third reversible D.-C. electric motor for moving said probe assembly across the electrolytic tank perpendicular to such reference direction, a sine potentiometer connected to provide a first voltage having a value proportional to the cosine of the angle between the direction of probe alignment and such reference direction and to provide a second voltage having a value proportional to the sine of such angle, means for operating said second motor at a speed proportional to the value of said first voltage, means for operating said third motor at a speed proportional to the value of said second voltage, means to provide third and fourth voltages having phases related to the direction of alignment of said probes, said third and fourth voltages being in phase quadrature with each other, means to provide a reference electric potential equal to that of the equipotential line to be traced, means including two phase sensitive detectors each connected in responsive relation to differences between the electric potential of one of said probes and said reference potential and respectively responsive to said third and fourth voltages to provide fifth and sixth voltages having values related to such difference of potential and its phase relation to said third and fourth voltages, and means for modifying the speeds of said second and third motors in accordance with the values of said fifth and sixth voltages, respectively, whereby the probe assembly is automatically returned to the equipotential line whenever its position deviates therefrom.

16. A field mapping machine comprising a tank containing an electrolytic solution, two sets of electrodes within said solution, an oscillator connected to apply alternating voltage between said two sets of electrodes, a probe assembly having three probes positioned to extend into said solution between said two sets of electrodes, a first reversible D.-C. electric motor, means including a phase sensitive detector connected to two of said probes in responsive relation to voltage therebetween and connected in operating relation to said first motor to operate such motor upon the occurrence of such voltage in a direction dependent upon the phase of the voltage, a first selsyn transmitter and a selsyn receiver electrically connected together, said first transmitter having a rotor connected for rotation by said first motor upon operation thereof and said receiver having a rotor connected to rotate said probe assembly, whereby the probe assembly is aligned tangent to an equipotential line, means including a second reversible D.-C. motor for moving said probe assembly across the electrolytic tank in a reference direction, means including a third reversible D.-C. motor for moving said probe assembly across said tank perpendicular to said reference direction, means including a sine potentiometer connected to said first motor to provide a first voltage having a value proportional to the cosine of the angle between the direction of probe alignment and said reference direction and a second voltage having a value proportional to the sine of such angle, means for operating said second motor at a speed proportional to said first voltage, means for operating said third motor at a speed proportional to said second voltage, means including a second selsyn transmitter connected to said first motor for providing third and fourth voltages having phases related to the direction of alignment of said probe assembly, said third and fourth voltages being in phase quadrature with each other, a potentiometer having an adjustable tap connected between said two sets of electrodes, means including a phase sensitive detector connected to said adjustable tap and to one of said probes in responsive relation to differences in potential therebetween to provide a fifth voltage having a value related to such difference in potential and its phase relation to said third voltage, means including a phase sensitive detector connected to said adjustable tap and to one of said probes in responsive relation to differences in potential therebetween to provide a sixth voltage having a value related to said difference in potential and its phase relation to said fourth voltage, and means for modifying the speeds of said second and third motors according to the values of said fifth and sixth voltages respectively.

KENNETH O. STRANEY.

REFERENCES CITED

The following references are of record in the file of this patent:

Electron Optics, by L. M. Myers, published by D. Van Nostrand Company, New York, 1939, pages 135–142.

The Review of Scientific Instruments, "Automatic plotting of electrostatic fields," by Paul E. Green, volume 19, No. 10, pages 646–653, October 1948.